April 13, 1954  W. H. JACOBS  2,675,145
CIRCULATION EQUIPMENT FOR ORANGE JUICE DISPENSERS
Filed May 20, 1950  3 Sheets-Sheet 1
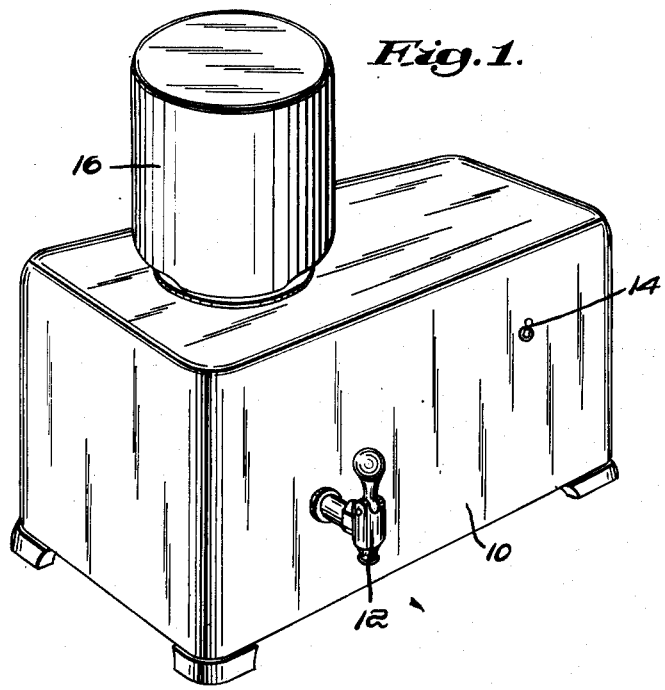
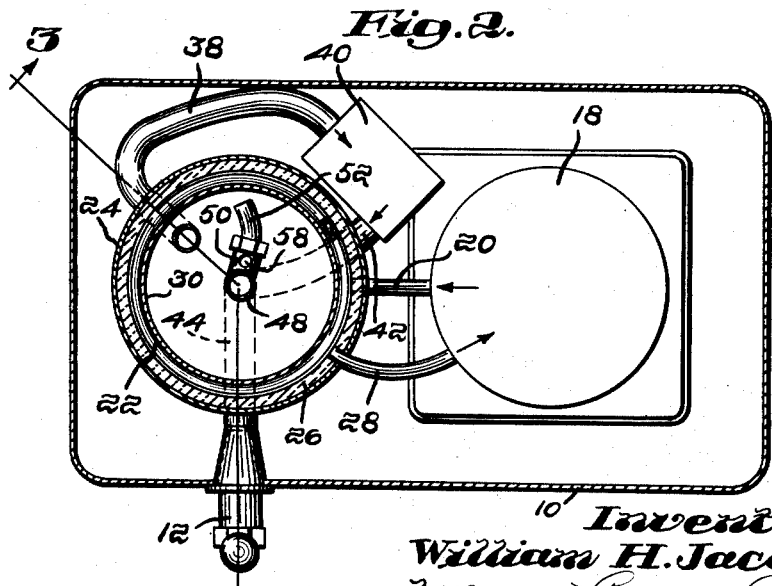
Inventor:
William H. Jacobs,
by
Attorneys April 13, 1954 — W. H. JACOBS — 2,675,145
CIRCULATION EQUIPMENT FOR ORANGE JUICE DISPENSERS
Filed May 20, 1950 — 3 Sheets-Sheet 2

Inventor:
William H. Jacobs,
by Thomson & Thomson
Attorneys

April 13, 1954 W. H. JACOBS 2,675,145
CIRCULATION EQUIPMENT FOR ORANGE JUICE DISPENSERS
Filed May 20, 1950 3 Sheets-Sheet 3

Inventor:
William H. Jacobs,
by Thomson & Thomson
Attorneys

Patented Apr. 13, 1954

2,675,145

UNITED STATES PATENT OFFICE 2,675,145

CIRCULATION EQUIPMENT FOR ORANGE JUICE DISPENSERS

William H. Jacobs, Newton, Mass.

Application May 20, 1950, Serial No. 163,135

3 Claims. (Cl. 222—146)

1

This invention relates to improvements in circulation equipment for orange juice dispensers or for dispensers for other beverages including bottled water.

My invention is particularly directed to improvements in beverage dispensers having means for keeping the beverage cool. Dispensers of this type are used for dispensing orange juice, either fresh juice or orange juice prepared by mixing frozen orange concentrate with water. Orange juice usually contains some solid matter, such as some of the pulp of the fruit, and it is desirable to keep such juice in constant circulation. Furthermore, dispensers which are in frequent use require circulation of the beverage so that the juice dispensed will be uniformly cool.

It is an object of my invention to provide an improved means which may be readily built into present designs of cooling dispensers to provide for circulation of the juice in the container from which the juice is dispensed.

It is further an object of my invention to provide circulation means which will spray and aerate at least part of the juice circulated and thereby maintain the palatableness of the beverage.

Further objects and advantages of my improvements will be more readily apparent from the following description of preferred embodiments thereof as illustrated in the accompanying drawings, in which:

Fig. 1 is a perspective view of the cooling and dispensing equipment;

Fig. 2 is a horizontal cross-section of the apparatus shown in Fig. 1;

Figure 3:
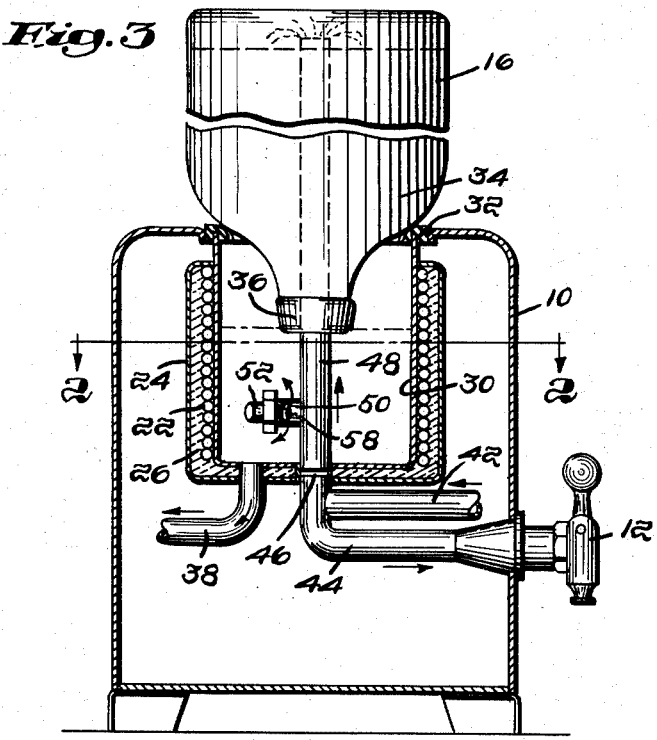
Fig. 3 is a vertical section taken on the plane indicated 3—3 in Fig. 2.
Figure 4:
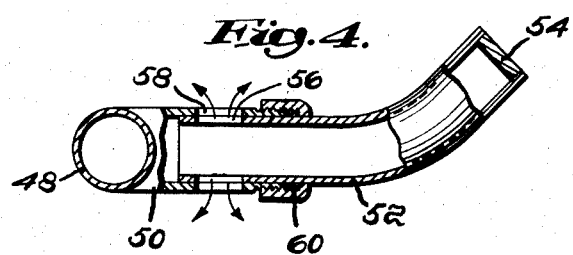
Fig. 4 is an enlarged view, partially in section, of the control valve for the circulation of the fluid.

Figure 1 shows an exterior view of the cooling and dispensing system. The fluid dispensed may be water, orange juice, or any other beverage that should be cooled when dispensed. The housing 10 encloses the mechanism. The spigot 12 is used for dispensing the liquid. The switch 14 controls the pump for circulation of the liquid. The container 16 on the top of the housing is preferably made of glass or other transparent materials, so that the liquid or juice contained therein is visible.

Referring to Figure 2, the cooling equipment may be of any suitable type, including a compressor condenser unit 18 from which the condensed liquid is piped from the pipe 20 to the evaporating cooling coils 22. The coils 22 are enclosed in the housing 24 with suitable insulation 26. The refrigerant is drawn off through the pipe 28 back to the compressor and condenser.

As shown in Fig. 3, a container 30 is mounted within the housing 10 and enclosed by the housing 24 and the liquid in the container is kept cool by the cooling coils surrounding the container. The opening in the top of the housing has a rubber ring 32 in which is set, as shown in Fig. 3, the bottle 34. The rubber ring 32 is preferably made with notches to admit air to the container 30 so that the top of the liquid in the container 30 is under atmospheric pressure. As shown, the bottle is placed upside down but the liquid in the container 30 will not rise above the mouth 36 of the bottle 34.

The liquid in the container 30 is drawn off through the pipe 38 and the liquid is delivered to the pump 40. The pump 40 may be of any suitable design. The liquid is then delivered through the pipe 42 to the elbow pipe 44. The liquid in the pipe 44 may be drawn off for dispensing the liquid by opening the spigot 12. The pipe 44 is also connected at 46 to the bottom of the container 30. Within the container 30 and extending up into the bottle 34 is a vertical standpipe 48. The pipe 48 preferably has a slip joint on the upper end of the pipe 44 so that the pipe 48 may be readily removed for cleaning. The liquid in the pipe 48 is delivered by the action of the pump into the bottle 34, as clearly shown in Fig. 3. The liquid may be sprayed as it is delivered from the upper end of the pipe 48 so as to cause some aeration of the liquid, the air being received from the air pocket in the top of the bottle 34.

In addition to circulating the liquid, as described, through the upper end of the pipe 48, some of the liquid may be recirculated directly into the container 30. I provide a nipple 50 extending from the pipe 48 into which extends a short tube 52 which is closed at its outer end 54 but which is provided with openings 56 adapted to cooperate with openings 58 in the nipple 50. A packing gland 60 is provided to make a tight joint between the nipple 50 and the tube 52. It will be understood that by turning the tube 52 the amount of the liquid which is recirculated directly into the container 30 may be controlled and the flow increased or decreased.

Figure 5:
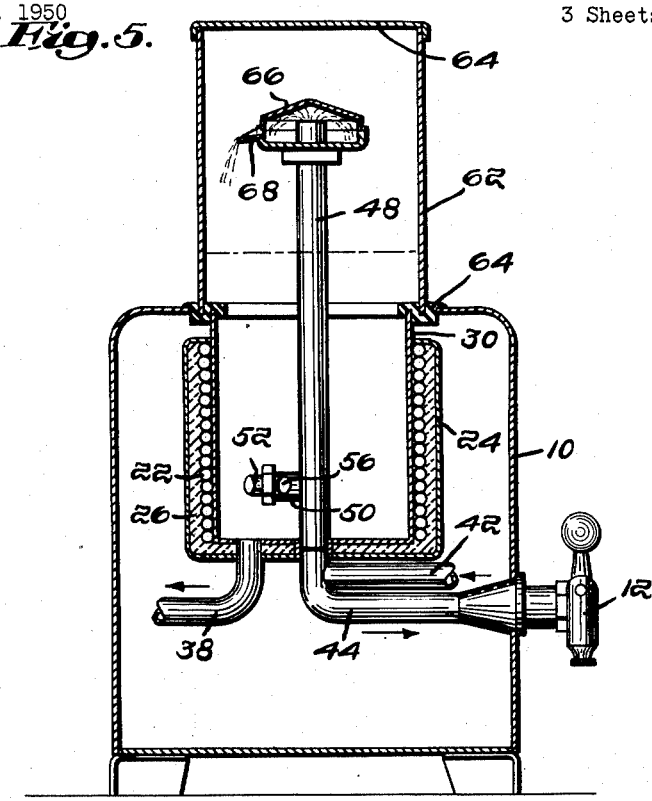
Fig. 5 is a vertical section similar to Fig. 3 but showing a modification.

Figure 5 shows equipment which is generally similar to Fig. 3 but in place of the bottle 34 I have used a transparent liquid receiver 62 which may be made of plastic. The receiver 62 is set into the rubber ring 64 which also seals the top of the container 30. The cover 64 for the receiver 62 fits loosely in place so that the liquid in the receiver is under atmospheric pressure. The equipment shown in Fig. 5 is principally used for display purposes. In this form, the vertical pipe 48 delivers the liquid in a spray within a device 66 shaped to resemble an orange squeezer. From this device, the liquid is delivered through the spout 68. The device 66 may also be made of transparent plastic so that the customers may see the visible spraying and aeration of the juice or other liquid being dispensed.

Figure 6:
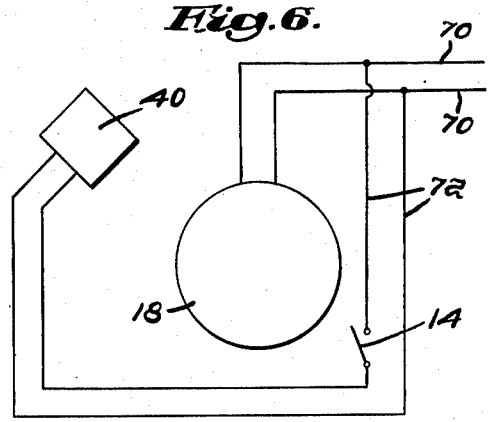
Fig. 6 is a schematic view of the electric wiring.

The wiring diagram shown in Fig. 6 illustrates the electrical connections 70 to the compressor 18 and the electrical circuit 72 leading to the circulating pump 40. The switch 14 in the circuit 72 controls the pump 40. At night, when the dispensing equipment is not in use, the circulating pump may be cut off by opening the switch 14.

Cooling and dispensing equipment as herein disclosed, may be used for bottled water in connection with water dispensers. In conventional equipment the water in the bottle is not kept as cool as the water in the bottom which is near the cooling coils. Therefore, if a considerable quantity of water is drawn off, it will be found that the water is not cold. With my equipment, the circulation of the water tends to keep all of the water close to the same temperature.

Another principal use of my cooling and dispensing equipment is for the dispensing of orange juice. The orange juice may be prepared from the frozen concentrated juice to which water must be added. The circulation of the juice helps to mix the concentrated juice with the water when the equipment is first prepared for use. In addition, the orange juice has some solid material which should be kept in suspension and the circulation of the juice prevents the settling of the pulp or other solid matter. It is also important to provide for not only agitation of the juice but circulation to aerate the juice which tends to improve the taste. On the other hand, too much aeration may be undesirable. Therefore, I provide for circulation by the pump and for delivering some of the juice directly into the liquid juice in the container without aeration while part of the juice is circulated and aerated by being sprayed into the air to then fall back into the liquid juice.

I claim:

1. In a beverage dispensing device, a beverage storage container, an outlet leading from said container, a by-pass line connected to the bottom of said container and leading back into said outlet below the bottom of said container, a standpipe in said container connected to said outlet, said standpipe having discharge openings at spaced points, one of which is below the level of the liquid in said container and the other of which is above the level of the liquid in said container, and a pump in said by-pass line for circulating beverage drawn from said container into said by-pass line, part of said circulated beverage being delivered back into the liquid beverage and the balance into the air space above the liquid beverage in said container.

2. In a beverage dispensing device, a beverage storage container, an outlet leading from said container, a by-pass line connected to the bottom of said container and leading back into said outlet below the bottom of said container, a standpipe in said container connected to said outlet, said standpipe having discharge openings at spaced points, one of which is below the level of the liquid in said container and the other of which is above the level of the liquid in said container, and a pump in said by-pass line for circulating beverage drawn from said container into said by-pass line, part of said circulated beverage being delivered back into the liquid beverage and the balance into the air space above the liquid beverage in said container, means for cooling the beverage in said container and means for regulating the amount of beverage which is circulated by said pump back into the liquid beverage in said container.

3. Apparatus as described in claim 2, said regulating means comprising a nipple leading from the discharge opening below the level of the liquid, ports in the wall of said nipple, a tubular plug rotatably mounted in said nipple and extending across said ports, and holes in the wall of said plug arranged to be moved in and out of register with said ports.

References Cited in the file of this patent

UNITED STATES PATENTS

| Number | Name | Date |
|---|---|---|
| 1,654,379 | Matzka | Dec. 27, 1927 |
| 1,712,701 | Hassensall | May 14, 1929 |
| 1,789,211 | Benham et al. | Jan. 13, 1931 |
| 2,087,465 | Bacher | July 20, 1937 |
| 2,370,390 | Berryman | Feb. 27, 1945 |
| 2,440,406 | Kerr | Apr. 27, 1948 |